US008661685B2

(12) United States Patent
Blees et al.

(10) Patent No.: US 8,661,685 B2
(45) Date of Patent: Mar. 4, 2014

(54) PREASSEMBLY AND INTEGRATION OF AIRCRAFT CABINS

(75) Inventors: Christoph Blees, Hamburg (DE); Niklas Halfmann, Hamburg (DE); Dieter Krause, Buchholz (DE); Marcus Gehm, Buxtehude (DE)

(73) Assignee: Airbus Operations GmbH (DE)

( * ) Notice: Subject to any disclaimer, the term of this patent is extended or adjusted under 35 U.S.C. 154(b) by 280 days.

(21) Appl. No.: 13/058,365

(22) PCT Filed: Aug. 3, 2009

(86) PCT No.: PCT/EP2009/059993
§ 371 (c)(1),
(2), (4) Date: Feb. 10, 2011

(87) PCT Pub. No.: WO2010/018090
PCT Pub. Date: Feb. 18, 2010

(65) Prior Publication Data
US 2011/0138603 A1 Jun. 16, 2011

Related U.S. Application Data

(60) Provisional application No. 61/188,815, filed on Aug. 13, 2008.

(30) Foreign Application Priority Data

Aug. 13, 2008 (DE) .......................... 10 2008 038 806

(51) Int. Cl.
*B21D 53/88* (2006.01)

(52) U.S. Cl.
USPC ................. 29/897.2; 29/897; 16/91; 16/96 R; 105/337; 105/338; 244/118.5; 244/137.1

(58) Field of Classification Search
USPC .............. 29/897–897.1, 897.2; 105/337, 338; 244/118.5, 137.1; 16/96 R, 102, 91
See application file for complete search history.

(56) References Cited

U.S. PATENT DOCUMENTS

| 4,799,631 | A | * | 1/1989 | Humphries et al. ....... 244/118.5 |
| 6,536,710 | B1 | | 3/2003 | Bobzien et al. |
| 7,270,297 | B2 | * | 9/2007 | Schaefer et al. ........... 244/137.1 |
| 7,874,516 | B2 | | 1/2011 | Cacciaguerra |
| 7,921,512 | B2 | * | 4/2011 | Michel ........................ 16/96 R |
| 8,091,197 | B2 | | 1/2012 | Frehel et al. |
| 2005/0184194 | A1 | | 8/2005 | Schaefer et al. |
| 2007/0295862 | A1 | | 12/2007 | Hupperich et al. |
| 2009/0250544 | A1 | | 10/2009 | Pasquale |
| 2009/0250554 | A1 | | 10/2009 | Graeber et al. |
| 2009/0272849 | A1 | | 11/2009 | Koefinger et al. |

FOREIGN PATENT DOCUMENTS

| CN | 101056796 A | 10/2007 |
| CN | 101060955 A | 10/2007 |
| DE | 1198680 B | 8/1965 |
| DE | 102006034862 A1 | 1/2008 |

(Continued)

*Primary Examiner* — Richard Chang
(74) *Attorney, Agent, or Firm* — Lerner, David, Littenberg, Krumholz & Mentlik, LLP

(57) ABSTRACT

According to an exemplary embodiment of the invention, pre-assembly and integration of part of an aircraft cabin takes place outside the aircraft structure by means of an assembly device. After pre-assembly, the part of the aircraft cabin is slid into the open section of the aircraft structure where it is installed.

11 Claims, 3 Drawing Sheets

(56) References Cited

FOREIGN PATENT DOCUMENTS

| DE | 102006039290 A1 | 3/2008 |
| DE | 102006048376 A1 | 4/2008 |
| DE | 102007050422 A1 | 4/2009 |
| EP | 0262704 A2 | 4/1988 |
| RU | 2240962 C2 | 11/2004 |
| WO | 2008043557 A1 | 4/2008 |
| WO | 2009124832 A2 | 10/2009 |

* cited by examiner

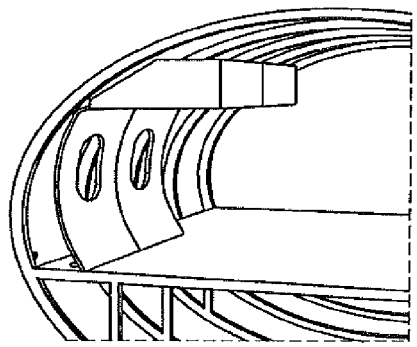
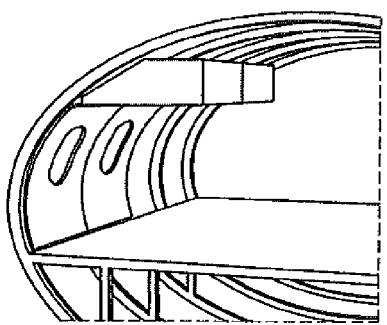
Fig. 3A　　　　　Fig. 3B
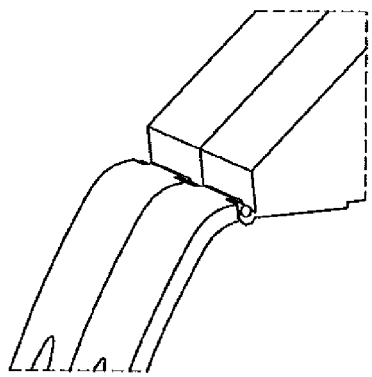
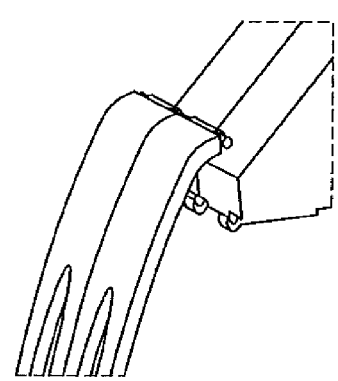
Fig. 3C　　　　　Fig. 3D
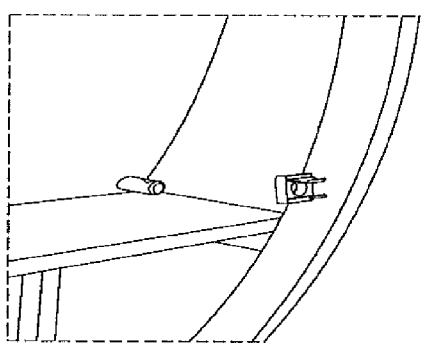
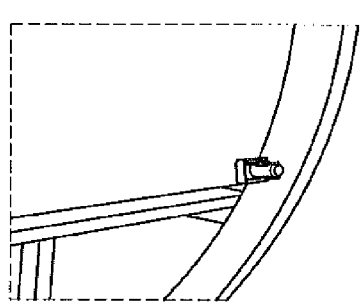
Fig. 4A　　　　　Fig. 4B

PREASSEMBLY AND INTEGRATION OF AIRCRAFT CABINS

CROSS-REFERENCE TO RELATED APPLICATIONS

This application is a national phase entry under 35 U.S.C. §371 of International Application No. PCT/EP2009/059993, filed Aug. 3, 2009, published in German, which claims the benefit of the filing date of U.S. Provisional Application No. 61/188,815, filed Aug. 13, 2008, and of German Patent Application No. 10 2008 038 806.8, filed Aug. 13, 2008, the entire disclosures of which applications are hereby incorporated herein by reference.

FIELD OF THE INVENTION

The invention relates to the assembly and integration of aircraft cabins. In particular, the invention relates to an assembly device for the pre-assembly and integration of at least part of an aircraft cabin in an aircraft structure, to an aircraft-component assembly system and to a method for the pre-assembly and integration of at least part of an aircraft cabin in an aircraft structure.

BACKGROUND TO THE INVENTION

A substantial percentage of the costs and of the throughput time of aircraft relates to the final assembly of the cabin. The multitude of lining panels, overhead stowage bins and components of the supply duct that are to be assembled in the aircraft result in long throughput times.

In the present assembly procedure, first the middle part of the three-part lateral lining is installed. This is followed by the assembly of the overhead stowage bins. After the assembly of the stowage bins, underneath the stowage bins, according to the seating arrangement in the aircraft, the supply duct comprising sub-units is constructed. Subsequently the assembly of the upper and lower part of the lateral lining and the ceiling lining takes place.

Integration of the components of the lining takes place through the passenger door. Larger components, galleys and toilets are, however, placed in the open sections prior to final assembly of the fuselage. In cases where this is not possible because the structure is closed at some other location and the cabin is integrated only thereafter, dismantling the subassemblies to form units that fit through the door is required. However, this results in a significant increase in assembly effort. In the context of the invention it is assumed that integration in the open section is possible.

US 2007295862 A discloses a modular wall system for aircraft cabins, in which system the wall segments are, however, installed only within the aircraft cabin.

DE 102006048376 discloses a cabin structure unit for attaching cabin modules for an aircraft. The cabin structure unit is designed so as to be self-supporting.

DE 102006039290 discloses a frame element for use in an aircraft-component assembly system that can be attached to an aircraft structure and comprises at least one fastening device for fastening at least one aircraft interior component or at least one insulation package to the frame element.

SUMMARY OF THE INVENTION

It is an object of the invention to shorten the assembly time of the aircraft structure and the aircraft cabin.

Stated are an assembly device, an aircraft-component assembly system and a method according to the characteristics of the independent claims. Further embodiments of the invention are stated in the subordinate claims.

The described exemplary embodiments relate equally to the assembly device, the aircraft-component assembly system and the method.

According to an exemplary embodiment of the invention, an assembly device for the pre-assembly and integration of at least part of an aircraft cabin in an aircraft structure is stated, wherein the assembly device comprises an assembly frame that is designed for pre-assembly of the part of the aircraft cabin. Furthermore, a transportation system is provided for affixing the pre-assembled part of the aircraft cabin to the assembly frame and for sliding the pre-assembled part from the assembly frame to an open section of the aircraft structure.

Thus the aircraft structure and parts, or even the entire aircraft cabin can be pre-assembled in parallel at various locations. As a result of the pre-assembly of the cabin, parallelisation of the assembly activities and thus shortening of the throughput time can be made possible.

The lining panels of the cabin are thus not serially assembled in the corresponding section of the aircraft structure only after completion of the aircraft structure.

According to a further exemplary embodiment of the invention, the part of the aircraft cabin, which part is pre-installed, comprises cabin sidewall panels and overhead stowage bins and/or if applicable a supply duct.

According to a further exemplary embodiment of the invention, the pre-installed part of the aircraft cabin comprises a ceiling lining.

Thus, pre-assembly relates, for example, in each case only to the linings on one side of the fuselage, as well as to a number of stowage bins with an assembled supply duct, or alternatively to the entire arc of the aircraft cabin including the ceiling lining.

According to a further exemplary embodiment of the invention, the assembly frame corresponds to the aircraft structure, i.e. replicates the aircraft structure. This results in the part or parts of the aircraft cabin that is/are to be pre-assembled, or in the entire aircraft cabin that is to be pre-assembled, being attached to the assembly frame in principle in precisely the same manner as is the case later in the corresponding section of the aircraft structure. To this effect the assembly frame can be connected directly to the aircraft structure, or at least it can be arranged directly beside said aircraft structure, so that subsequent transfer (sliding) of the pre-assembled parts, or of the pre-assembled part, of the aircraft cabin into the open section of the aircraft structure can be carried out in a simple manner without in this process subjecting the pre-assembled part to significant mechanical loads.

According to a further exemplary embodiment of the invention, the transportation system is designed as a rail system. To this effect it comprises one or several rails and one or several retaining members for affixing the pre-assembled part of the aircraft cabin to the assembly frame. Furthermore, the rails and the retaining members are used for sliding the pre-assembled part from the assembly frame to the open section of the aircraft structure.

To this effect the retaining member engages, for example, the rail, as shown in FIGS. 1 and 2.

Furthermore, it is possible for the retaining member to be designed, for example, in the form of a roll that runs on the rail. Furthermore, it is possible to remove the retaining members and/or the rails after final installation of the aircraft cabin in the aircraft structure. Moreover, it is possible to design the retaining members and/or the rails in such a manner that they can be used as attachment points for attaching the aircraft cabin to the aircraft structure. In this manner further installation expenditure can be saved.

According to a further exemplary embodiment of the invention, the rail is integrated in the aircraft structure and in the assembly frame. It is also possible to provide several rails, wherein one of the rails is integrated in the aircraft structure while a further rail, which is separate from the other rail, is integrated in the assembly frame or is attached to said assembly frame. In this case the retaining members are attached to, or integrated in, the overhead stowage bins or other positions in the aircraft cabin or in parts of the aircraft cabin.

According to a further exemplary embodiment of the invention, the rail is integrated in the overhead stowage bins, wherein the retaining members are fastened to the frame elements of the aircraft structure.

According to a further exemplary embodiment of the invention, the transportation system comprises access openings in order to provide access to the retaining members for affixing the pre-assembled cabin part in the x-direction, or to make it possible to achieve tolerance compensation or to disassemble the aircraft cabin in the case of maintenance.

The x-direction refers to the direction of flight, in other words to the longitudinal axis of the aircraft structure.

According to a further exemplary embodiment of the invention, the assembly device comprises a bearing arrangement for the hinged installation of the cabin sidewall panels underneath the overhead stowage bins. In this way a situation can be achieved in which, prior to sliding the cabin part into the section in the aircraft structure, the lateral linings can be folded inwards, without said linings for this procedure having to be detached from their stays.

For example snap connections are provided for final affixation of the cabin sidewall panels.

According to a further exemplary embodiment of the invention, an aircraft-component assembly system for the assembly of aircraft components of an aircraft is stated, which system comprises individual components of an aircraft cabin and an assembly device, described above and below, for the pre-assembly and integration of at least part of the aircraft cabin in an aircraft structure.

According to a further exemplary embodiment of the invention, a method for the pre-assembly and integration of at least part of an aircraft cabin in an aircraft structure is stated, in which method individual components of the aircraft cabin are pre-assembled by means of an assembly device, and the pre-assembled components are slid from the assembly device to an open section of the aircraft structure with the use of a transportation system of the assembly device.

According to a further exemplary embodiment of the invention, corresponding cabin sidewall panels underneath the overhead stowage bins are hinged, and for integration of the pre-assembled components of the aircraft cabin said cabin sidewall panels are folded inwards or into the aircraft structure.

Below, preferred exemplary embodiments of the invention are described with reference to the figures.

BRIEF DESCRIPTION OF THE FIGURES

FIGS. 3A to 3D show diagrammatic views of a sidewall suspension according to an exemplary embodiment of the invention.

FIGS. 4A and 4B show diagrammatic views of a snap connection according to an exemplary embodiment of the invention.

DETAILED DESCRIPTION OF EXEMPLARY EMBODIMENTS

Figure 1:
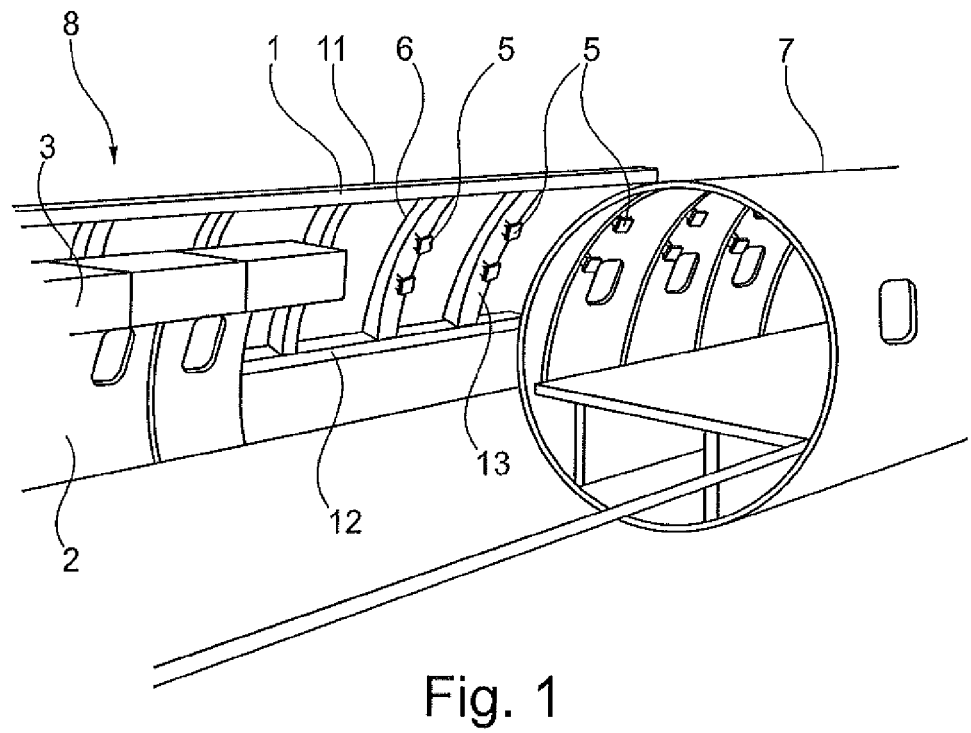
FIG. 1 shows a diagrammatic view of an aircraft structure and an assembly device according to an exemplary embodiment of the invention.

The illustrations in the figures are diagrammatic and not to scale.

In the following description of the figures the same reference characters are used for identical or similar elements.

FIG. 1 shows a diagrammatic view of an aircraft structure 7 and of an assembly device 8 that corresponds to, in other words is attuned to, said aircraft structure 7. The assembly device 8 comprises an assembly frame 1. The assembly frame 1 comprises, for example, several parallel segments 11, 12 that are arranged so as to be essentially horizontal, as well as transverse segments (see for example reference characters 6 and 13) that are placed vertically to the aforesaid and reproduce the aircraft structure.

On the transverse segments 6, 13 and also on the aircraft ribs, i.e. on the frame elements and/or stringers of the aircraft structure 7, retaining members 5 are attached.

These retaining members 5 engage corresponding rails that are attached to the pre-installed aircraft cabin and that carry the pre-installed aircraft cabin.

Furthermore, a supply duct 3 as well as the linings of one side of the aircraft (see reference character 2) are provided.

The assembly frame 1, the lateral lining panels 2 and the supply duct 3 form an aircraft-component assembly system.

The invention relates to a novel assembly concept that makes it possible to pre-assemble the lining panels as well as the hatracks and the service duct. As shown in FIG. 1, in the context of this concept the assembly of the cabin lining takes place in an assembly frame 1 that reproduces the fuselage structure. In this process, as shown, pre-assembly can in each case relate only to the linings of one side 2 and to a number of stowage bins with the supply duct installed. As an alternative to this, the entire arc of the aircraft cabin including the ceiling lining can be pre-assembled (not shown in FIG. 1).

As a result of the parallelisation, made possible in this manner, of the structural assembly and cabin assembly it is possible to achieve significant shortening of the throughput time of the cabin assembly. Furthermore, as a result of pre-assembly being carried out in a frame, the percentage of work that has to be carried out in an awkward position (in other words with limited movement space being available to installers) can be significantly reduced because access to the components is possible in a very easy manner and from both sides. As a result of improved access and the expanded handling space, automation of pre-assembly is also made possible.

As a result of the above the required process steps can be carried out more quickly, and, if required, by a larger number of installers than would be possible in the interior of the aircraft.

Attachment of the lining panels is by way of a rail concept. This makes it possible for the pre-assembled cabin lining to be pushed from the assembly frame into the open section. In order to allow the use of the space between frame elements behind the lateral linings (for example for the window funnel), the lateral lining panels are installed underneath the overhead stowage bins so as to be hinged. This is, for example, shown in FIG. 3.

FIGS. 3A to 3D show diagrammatic views of a hinged suspension arrangement of the lateral lining panels.

As shown in FIG. 3A, the sidewall lining panels 2 are hinged in the region of the supply duct 3. After the aircraft cabin or the pre-installed part of the aircraft cabin has been pushed into the aircraft structure, the sidewall lining panels 2 can be folded outwards (see FIG. 3B). During the folding outwards of the sidewall lining panels the plug-in connection 302, which is located in the lower region of the sidewall lining panel 2, engages the corresponding counterpart 301 on the aircraft structure so that the sidewall lining panel is locked into place.

FIGS. 3C and 3D show an enlargement of a detail of the upper region of the sidewall lining panels 2. As shown in FIG. 3C, the sidewall lining panels 2 are hinged on the overhead stowage bins or on the supply duct. To this effect semicircular bearing arrangements 304 are provided at the supply duct 3, against which bearing arrangements 304 the axle-like lugs 305 of the sidewalls 2 come to rest so that the sidewalls 2 can hinge on the axis defined in this manner.

For integration in the fuselage the sidewall lining panel is slightly folded inwards. In the section concerned, firstly, final affixation of the subassembly in the x-direction and tolerance compensation between the aircraft structure and the distribution components takes place. Finally, the required system interfaces (electrical current, information, air, oxygen) are interconnected, and the sidewall lining panels are folded out into their final positions.

Integration of the rail can be carried out according to two concepts. The first approach consists of integrating the rail in the aircraft structure. To this effect the retaining members are attached to the overhead stowage bins. As an alternative, the rail 4 can be integrated in the overhead stowage bins. In this case the retaining members are located on the aircraft structure (see FIG. 2).

Figure 2:
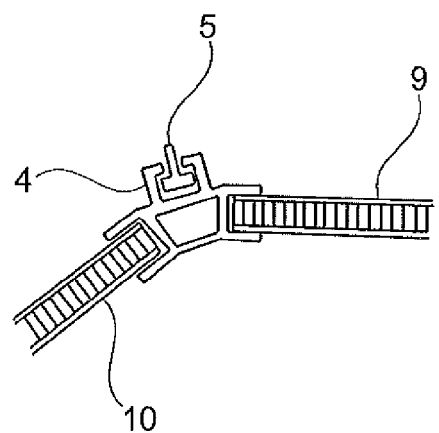
FIG. 2 shows the integration of a rail in an overhead stowage bin according to an exemplary embodiment of the invention.

FIG. 2 shows two parts 9, 10 of an overhead stowage bin, as well as a cross section of the rail 4 and a retaining member 5 that is slidable along the rail and that engages the rail.

In this case the rail can additionally assume the function of an edge connection at the corners of the stowage bin and can thus to the greatest extent possible be designed so as to be weight-neutral. As shown in FIG. 1, the corresponding retaining members 5 are fastened to the frame elements. Access to the fastening elements for affixation in the x-direction, for tolerance compensation and for deinstallation in the case of maintenance is made possible by means of access openings in the guide rail.

Attachment of the sidewall lining panels following folding-out can take place at the lower end, for example by snap connections.

FIGS. 4A and 4B show such attachment of the sidewall lining panels by means of snap connections.

The snap connections 301, 302 comprise, for example, a bar-shaped or axle-shaped protrusion (lug) 302, that is attached to the sidewall lining panel 2. The counterpart is formed by a securing element 301 that comprises a recess or hole which is engaged by the lug 302 when the sidewall 2 is hinged outwards. On the rear of the securing element 301 a clip 401 is provided, which secures the pin 302 against sliding out in that it engages the recess 402 of the pin when the pin has been slid a sufficient distance into the hole.

Figure 5:
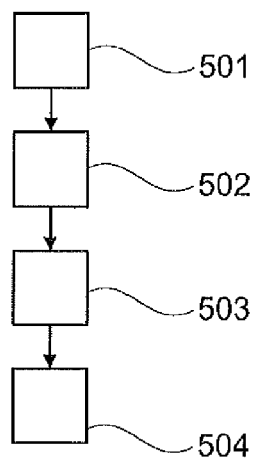
FIG. 5 shows a flow chart of a method according to an exemplary embodiment of the invention.

FIG. 5 shows a flow chart of a method according to an exemplary embodiment of the invention. In step 501 individual components of the aircraft cabin are pre-assembled with the help of an assembly device. Pre-assembly takes place outside the corresponding section of the aircraft structure. In step 502 the cabin sidewall panels are provided with a hinge arrangement. Such hingeing takes place underneath the overhead stowage bins.

In step 503 the cabin sidewall panels are hinged inwards to integrate the pre-assembled components of the aircraft cabin in the section of the aircraft structure. Subsequently, in step 504 the pre-assembled components are slid from the assembly device into an open section of the aircraft structure. To this effect the transportation system of the assembly device is used.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. An assembly device for pre-assembly and integration of at least a part of an aircraft cabin in an aircraft structure, the assembly device comprising:
    an assembly frame configured for pre-assembly of the part of the aircraft cabin onto the assembly frame outside the aircraft structure; and
    a transportation system for affixing the pre-assembled part of the aircraft cabin to the assembly frame and for sliding the pre-assembled part of the aircraft cabin from the assembly frame into an open section of the aircraft structure;
    wherein the transportation system includes a rail system comprising at least one rail and a plurality of retaining members for affixing the pre-assembled part of the aircraft cabin to the assembly frame, and for sliding the pre-assembled part of the aircraft cabin from the assembly frame into the open section of the aircraft structure.

2. The assembly device of claim 1,
    wherein the part of the aircraft cabin comprises cabin sidewall panels and overhead stowage bins.

3. The assembly device of claim 2,
    further comprising bearing arrangements for hingedly installing of the cabin sidewall panels underneath the overhead stowage bins.

4. The assembly device of claim 1,
    wherein the part of the aircraft cabin comprises a ceiling lining.

5. The assembly device of claim 1,
    wherein the assembly frame corresponds to the aircraft structure and thus replicates the aircraft structure.

6. The assembly device of claim 1,
    wherein the at least one rail is integrated in the aircraft structure and in the assembly frame; and
    wherein the retaining members are integrated in overhead stowage bins.

7. The assembly device of claim 1,
    wherein the at least one rail is integrated in overhead stowage bins; and
    wherein the retaining members are fastened to frame elements of the aircraft structure.

8. The assembly device of claim 1,
    wherein the transportation system comprises access openings in order to provide access to the retaining members for affixation in a x-direction, tolerance compensation or for disassembling the aircraft cabin during maintenance.

9. An aircraft-component assembly system for assembling aircraft components, the aircraft-component assembly system comprising:
- a plurality of individual components of an aircraft cabin; and
- an assembly device for pre-assembling and integrating at least a part of the aircraft cabin in the aircraft structure;
- wherein the assembly device comprises:
- an assembly frame configured for pre-assembly of the part of the aircraft cabin onto the assembly frame outside of the aircraft structure;
- a transportation system for affixing the pre-assembled part of the aircraft cabin to the assembly frame and for sliding the pre-assembled part of the aircraft cabin from the assembly frame into an open section of the aircraft structure; and
- wherein the transportation system includes a rail system comprising at least one rail and a plurality of retaining members for affixing the pre-assembled part of the aircraft cabin to the assembly frame, and for sliding the pre-assembled part of the aircraft cabin from the assembly frame into the open section of the aircraft structure.

10. A method for pre-assembling and integrating at least a part of an aircraft cabin in an aircraft structure, the method comprising:
- pre-assembling of individual components of the part of the aircraft cabin onto an assembly device outside of the aircraft structure;
- sliding the pre-assembled components from the assembly device into an open section of the aircraft structure using a transportation system of the assembly device;
- wherein the transportation system is configured as a rail system comprising at least one rail and a plurality of retaining members for affixing the pre-assembled components to the assembly frame, and for sliding the pre-assembled components from the assembly frame into the open section of the aircraft structure.

11. The method of claim 10, wherein the individual components of the aircraft cabin comprise cabin sidewall panels and the method further comprises:
- hingedly installating the cabin sidewall panels underneath overhead stowage bins;
- folding the cabin sidewall panels inwards for integrating the pre-assembled components of the aircraft cabin in the open section of the aircraft structure.

* * * * *